United States Patent

[11] 3,564,144

[72] Inventors Hans Diggelmann
Muri, Bern;
Rudolf Kuehne, Berne, Switzerland

[21] Appl. No. 660,392
[22] Filed Aug. 14, 1967
[45] Patented Feb. 16, 1971
[73] Assignee Hasler A. G.
Berne, Switzerland
[32] Priority Aug. 15, 1966
[33] Switzerland
[31] 11715/66

[54] METHOD AND APPARATUS FOR TIME MULTIPLEX TRANSMISSION OF ELECTRICAL DIGITAL SIGNALS COMPRISING A PLURALITY OF TRANSMISSION CHANNELS
9 Claims, 2 Drawing Figs.

[52] U.S. Cl. ........ 179/15
[51] Int. Cl. ........ H04j 5/00
[50] Field of Search ........ 179/15 (A), (SIG), (SYNC), (ASYNC), (BWR), (APC), (VDR); 178/2 (Cursory), 50, 53.1

[56] References Cited

UNITED STATES PATENTS

| | | | |
|---|---|---|---|
| 3,020,337 | 2/1962 | Zarcone | 179/15 |
| 3,261,001 | 7/1966 | Magnin | 178/50 |
| 3,337,687 | 8/1967 | Normand et al. | 178/53.1 |
| 3,387,086 | 6/1968 | Beresin | 178/53.1 |

*Primary Examiner*—Kathleen H. Claffy
*Assistant Examiner*—David L. Stewart
*Attorney*—Brady, O'Boyle & Gates

ABSTRACT: This invention relates to a method and means for transmitting electrical signals comprising a plurality of transmission channels in digital form over a transmission line wherein the transmission time is divided into frame periods of equal length. The frame periods are further subdivided into channel periods which are assigned to selected transmission channels. The invention contemplates the transmission through the main channels and through auxiliary channels to which no channel periods are assigned.

Inventors
HANS DIGGELMANN &
RUDOLF KÜHNE
BY
Brady, O'Boyle & Gates

METHOD AND APPARATUS FOR TIME MULTIPLEX TRANSMISSION OF ELECTRICAL DIGITAL SIGNALS COMPRISING A PLURALITY OF TRANSMISSION CHANNELS

BACKGROUND OF THE INVENTION

Time division multiplex systems are known to those skilled in the art and operate first to transmit telegraphic signals from message signal sources to apparatus such as teletypewriters and, secondly, for the transmission of telephone messages where the transmission is effected by means of pulse code modulation. In hitherto known signal multiplex transmission system, the number of channel periods in a frame period must at least be equal in number to the number of transmission channels so that during a frame period a signal from each source is transmitted. In addition, however, there are synchronization signals, which are mostly combined in a specific synchronization channel, and therefore one or more periods is allocated for this purpose.

Such a system a transmitter, transmission and receiver. Apparatus is known where the transmitter includes an input circuit which receives signals on a plurality of lines and feeds them to an information converter which converts the signals into a form suitable for multiplex transmission. This transmission is generally effected in such a way that a signal, for example a letter in teletype messages or an instantaneous value of voltage to be transmitted in telephone messages, is converted into a code word which consists of a number of digital, preferably binary signals, which are transmitted successively. From the information converter, the digital signals are coupled to an output unit which transmits the digital signals over a transmission line in suitable form. In the receiver the messages are processed in reverse order.

Experience has shown both teletype and telephone systems actually transmit messages only for a fraction of the total possible operation time. During the remainder of the time, signals are transmitted which indicate a state of rest of the signal source, i.e. no input signals present. The ever-present problem is to provide improved methods and apparatus to utilize a transmission line to transmit still more information, preferably in digital form at the same rate than is possible with presently known methods.

SUMMARY OF THE INVENTION

Accordingly, the present invention contemplates a method and apparatus wherein a majority of less frequently transmitted signals are transmitted as code words having a number of signal bits equal to the number of time slots of a channel period, while a minority of frequently transmitted signals are transmitted as code words having a lesser number of signal bits. The time slots of a channel period not used during the transmission of the short code words are used for the transmission of other code words of additional channels to which no definite channel periods have been assigned. The channels to which channel periods are definitely assigned are called main channels while the channels to which no definite channel periods have been assigned are called auxiliary channels. The time slots of a channel period are further subdivided into time slot groups. To each of the short code words is assigned a smaller number of time slot groups than to a long code word. In order to recognize the presence of a long or short code word, the first time slot group of each code word contains a corresponding identifying characteristic. The long code words are utilized for the transmission of messages from the input signal sources, while the short code words indicate the state of the input signal sources in which no messages are transmitted.

DESCRIPTION OF THE PREFERRED EMBODIMENT

Figure 1:
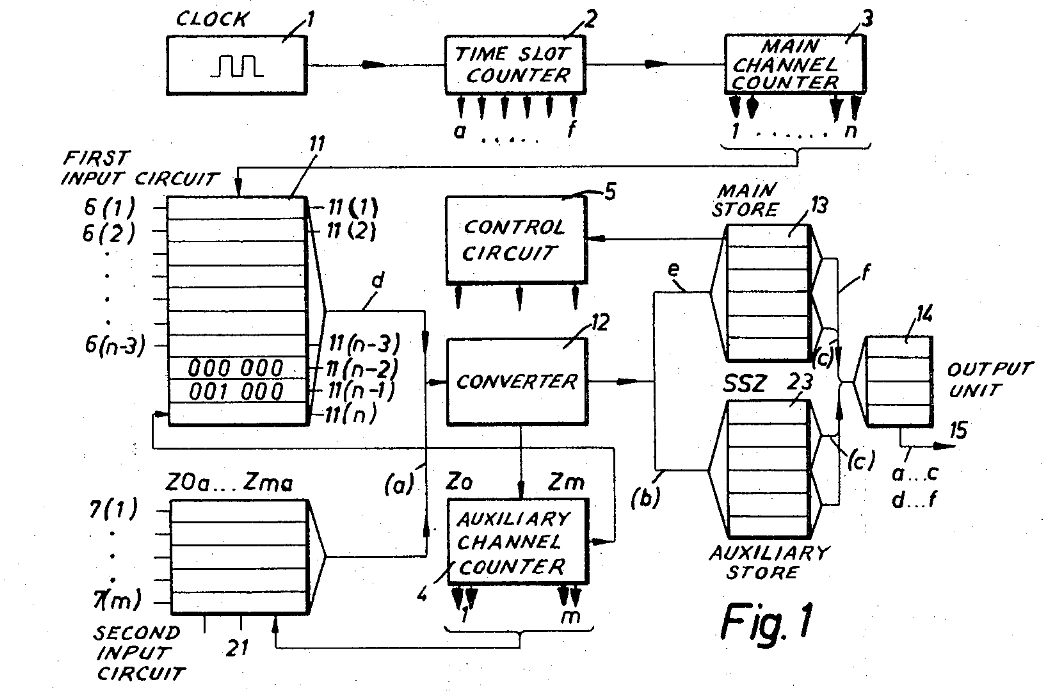
FIG. 1 is a block diagram of the transmitter apparatus of the subject invention for the transmission of teletype signals.

The present invention will be described in terms of a method and apparatus for the transmission of teletype signals. The transmitter and receiver are teletypewriters which transmit and receive in a start-stop mode of operation. The transmission over a channel is synchronous inasmuch as fewer signal elements (bits) are required for the transmission of a signal word and because the safety of transmission is higher.

The five bit code of the teletype code permits the transmission of 32 characters. However, the signals $\alpha$ (continuous start) and $\beta$ (continuous stop) must also be transmitted. Consequently, at least six bits are required for the subject invention in order to provide synchronous transmission.

Accordingly, a channel period and a long code word are defined as having six time slots or bits. This channel period of six bits is subdivided into two time slot groups of three bits each. The synchronous channel, however, is defined as having nine bits and 1½ channel periods as previously defined. The signals to be transmitted are subdivided into three types: (1) "operating" signals whose code words contain one time slot group; (2) "traffic" signals whose code words contain two time slot groups; and (3) "synchronization" signals whose code words contain three time slot groups. In a traffic signal the first bit is always a binary 1 with the other bits corresponding to the teletype code No. 2. The first bit of an operating signal and of the synchronization signals however is always a binary 0. After the first bit of a code word it can readily be recognized whether the signal is a traffic signal or an operating or synchronization signal. Code words for operating signals are as follows:

$\alpha$ (continuous start): 010
$\beta$ (continuous stop): 011
$\gamma$ (meaning freely selectable): 001
Synchronization signal: 000 000 001

If a code word corresponding to an operating signal, or to the second part of the synchronization signal, is transmitted in a channel, only one time slot group or three bits of a channel period is required. The second time slot group of the period is then used to transmit code words of additional channels to which no special channel periods have been assigned. The free time slot groups are assigned successively to the auxiliary channels. But, since it is not always certain that sufficient transmission time is available for the latter, either buffer storages or revertive connections to the transmitting subscribers must be provided in order to be able to block the flow of information.

As an example of the above, in one channel period or two channel periods for synchronization signals, the following time slot groups can thus be transmitted:

Traffic signal 1*xxxxx*
synchronization signal 000000 001*yyy*
operating signal $\alpha$ 010*yyy*
operating signal $\beta$ 011*yyy*
operating signal $\gamma$ 001*yyy* where $x$ corresponds to teletype code No. 2, and $y$ corresponds to the unused bits of a channel period.

It is seen then that the $y$ groups serve to permit transmission of signals for the auxiliary channels to which no special channel times are assigned. They correspond either to operating signals comprising three bits or to traffic signals comprising two successive $y$ groups. Since the combination 000*yyy* does not occur, there is at least one binary 1 in each channel period, except in the synchronization signal, so that the latter is identified.

In view of the foregoing, attention is now directed to FIG. 1 wherein a block diagram, illustrative of a preferred embodiment of the transmitter portion of the subject invention, is disclosed. The embodiment comprises a clock 1, a time slot counter 2, a main channel counter 3, an auxiliary channel counter 4, a control circuit 5, a first input circuit 11 having $n$–3 input leads 6(1)... 6($n$–3), a second input circuit 21 having $m$ input leads 7(1)... 7($m$), an information converter 12, a main store 13 and an auxiliary store 23 having six cells each, and an output unit 14.

The clock 1 output comprises clock pulses which are coupled to the time slot counter 2. The time slot counter 2 has six output leads which are designated $a$—$f$ on which pulses appear in cyclical succession. When a pulse appears on output lead $f$, a signal is coupled to the main channel counter 3 which increases its count by one additional count or step. Said main channel counter 3 has $m$ output leads and a signal appears in succession on each of the output leads 1 through $m$ as the counter is stepped in accordance with the time slot counter 2 output. The time duration of the outputs $a$—$f$ of the time slot counter 2 defines a channel period while the time duration of the outputs 1–$m$ of the main counter 3 defines a frame period. Each time slot in a frame is thus identified by the output pulses of the time slot counter 2 and the main channel counter 3.

The first input circuit 11 is connected by the leads 6(1)...6($nb8$–3) to $n$–3 message sources, not shown, which may be for example teletypewriters. Storage devices 11(1)...11($n$ –3) are respectively coupled to the leads 6(1)...6($n$–3) so that each is assigned to a source and is able to store at least the last received signal therefrom and, additionally, an indication of what the operating state of the respective source is. Also, three additional storage devices 11($n$–2), 11($n$–1), 11($n$) are included. In the storage device 11($n$–2) the first part of the synchronization signal, i.e., the binary number 000000 is permanently inscribed (it thus need not be present at all). The storage device 11($n$–1), on the other hand, contains the binary number 001000, the second part of the synchronization signal. The purpose of the storage device $n$ will be explained later in connection with the synchronization of the auxiliary channels.

Before proceeding further, it should be pointed out that the interconnecting leads which transmit signals between the above cited components, do so only at certain time periods and are designated by the letters $a$, $b$, etc. which correspond to the time slots $a$—$f$ controlled by signals on the output leads $a$—$f$. If the letter is bracketed - ( ) -, however, it indicates that a signal is not transmitted over a respective lead during that time period or interval, necessarily, during each channel period.

When a sync signal output from the time slot counter 2 appears on the output lead $d$, a signal stored in one of the individual storages 11(1)...11($n$) is fed to the information converter 12. If there is no signal ready in the interrogated storage devices 11(1)...11($n$) the code signal corresponding either to the command $\alpha$ or $\beta$ is transmitted, depending upon the state of the apparatus. The information conversion in the converter 12 causes a code conversion and consists in the simplest case of the addition of a binary 1 being placed in the first bit position, for example, in the case of a "traffic" signal; but there are also other possibilities of conversion, particularly if a transmission with error recognition or error correction is desired. In such case, however, it would be necessary to increase the number of time intervals in a channel period or the number of channel periods in a frame.

The code words of the main channels in the first input circuit 11 are transmitted from the converter 12 to the six digit main storage 13 at the time when the time slot counter output on lead e appears. Three bits are fed from this word during the time slot $f$ to the output unit 14 from where they are transmitted during the succeeding time slots $a$ through $c$, via. lead 15 to a receiver, in FIG. 2. The first code bit is fed in the meantime to the control circuit 5 and indicates whether it is a "traffic" signal (if it is a 1) or an "operating" signal (if it is a 0). Where a traffic signal occurs, the fourth through sixth bit is transmitted during the following time slot $c$ from storage 13 to the output unit 14 where it is transmitted therefrom during the same succeeding time slots $d$, $e$ and $f$ to the lead 15. Where an operating signal occurs this transmission is omitted. The control of the conditional transmissions is effected by the control circuit 5 in combination with the time slot counter 2 and the main channel counter 3 for the signals of the main channels.

The same function described with respect to the first input circuit 11 relating to the main channels is performed for the auxiliary channels by the second input circuit 21. Input leads 7(1)...7($m$) are respectively coupled to information sources, not shown, for signals which are to be transmitted in the auxiliary channels. During the sync period $a$ at which time a signal appears at output lead $a$ of the time slot counter 2 the signal is transmitted to the information converter 12.

The code word produced therein is fed to the auxiliary storage 23 during the time slot $f$ from where one-half of the code word is transmitted during the time slot $c$ to the output unit 14 and further during the time slots $d$—$f$ to the lead 15. As noted above, these transmissions do not necessarily take place every time slot $a$, $b$ and $c$. The reason for this is that at the time slot $c$, a part of an auxiliary code word is to be transmitted from the auxiliary storage 23 to the output unit only if there is no traffic signal in the main storage 13 which can be readily recognized from the fact that the first bit is a 0.

The auxiliary channel counter 4 is advanced by a half a count each time an "operating" signal appears in the code converter 12, whether it be in the main channel or an auxiliary channel. The counter 4, together with the control circuit five and the time slot counter 2, controls the transmissions of the auxiliary channel signals during the time slots $a$, $b$, and $c$. An example will be described for bits transmitted over selected main channels, for example 5 to 9, during the respective period thereof, together with the respective condition of the main channel counter 3 and the auxiliary channel counter 4.

| Input signal | Counter 3 | Counter 4 |
|---|---|---|
| 110101 | Channel 5 | Aux. channel 11. |
| 010110 | Channel 6 | Do. |
| 011111 | Channel 7 | Aux. channel 11½. |
| 011011 | Channel 8 | Aux channel 12. |
| 010100 | Channel 9 | Aux. channel 13. |

The first signal bit in main channel 5 is a 1 and thereby indicates that both time slot groups represent a "traffic" signal in the channel. The first signal bit in channel 6 however is a 0, meaning that an "operating" signal is present, which is the operating signal $\alpha$. The second time slot group of this signal is assigned to an auxiliary channel depending on the condition of the auxiliary counter 4 which is for example coupled to the eleventh auxiliary channel. Since counter 4 displays a whole number it will form the first time slot group or first part of a code word. In this instance it is 110, and since it starts with a 1, it is a traffic signal whose second part will be transmitted after the next operating signal in a main channel, in this case as second time slot group of channel 7. Likewise, the second time slot groups of the channels 8 and 9 belong to auxiliary channels. Those of channel 8 belong to auxiliary channel 12 and forms an operating signal since it begins with a 0. The second group of channel 9 becomes the first part of a traffic signal in the auxiliary channel 13. By each 0 in the first position of a code word the counter 4 is advanced by a half count. Apart from the synchronization of the main channels, the auxiliary channels must also be synchronized in order to insure their unequivocal assignment in the transmitter and receiver. According to the block diagram of FIG. 1, the condition of the auxiliary counter 4 is transmitted in the channel $n$ 4 a code word in the storage device 11($n$) and over the information converter 12 and the storage 13.

Another possibility of synchronizing the auxiliary channels which is not illustrated, uses instead of the main channel, a selected auxiliary channel in which the synchronization signal 000000 is transmitted, which cannot occur within agreed upon signals.

Figure 2:
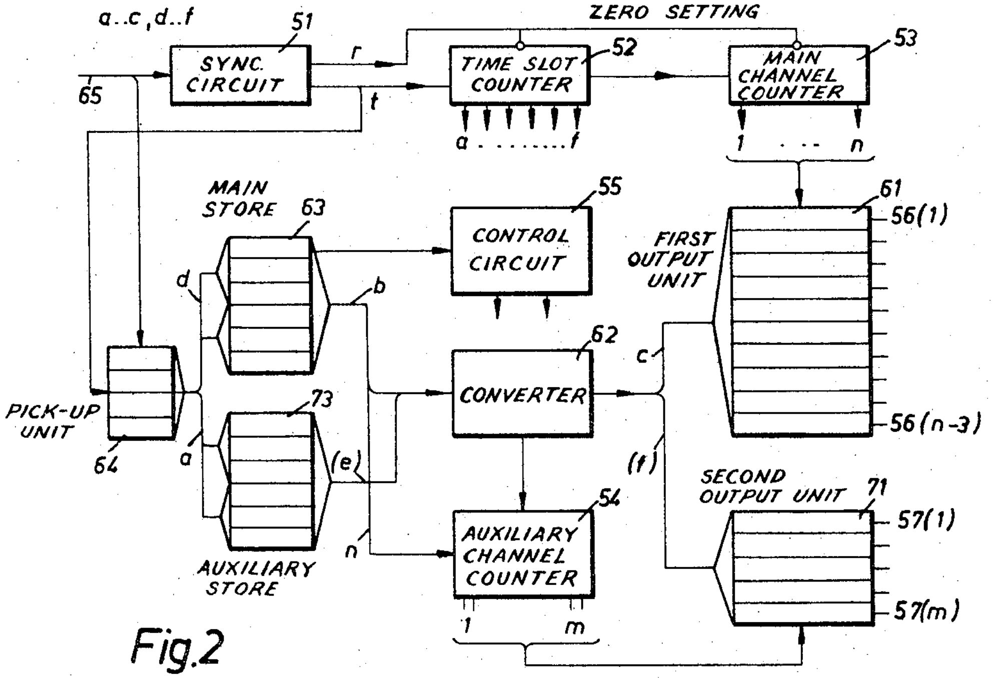
FIG. 2 is a block diagram of receiver apparatus utilized in combination with the transmitter apparatus illustrated in FIG. 1.

Referring now to FIG. 2, there is illustrated a block diagram of a receiver which is responsive to the signal output from the transmitter apparatus shown and described with respect to FIG. 1. Signals from the transmitter arrive on the lead 65, which lead is coupled to lead 15 of the transmitter either directly or over some form of transmission means. Lead 65 is connected to the input of a synchronization circuit 51 which generates a synchronization signal $t$. The synchronization signal $t$ drives a second time slot counter 52 which provides an output comprising slot pulses $a$—$f$ on correspondingly labeled output leads.

The time slot counter 52 in turn drives the main channel counter 53, which provides output signals 1 to $n$. A reset signal $r$ returns the time slot counter 52 and main channel counter 53 to their starting position, so that a synchronization is effected in a very short time.

The timing signal $t$ is also fed to and controls the pickup unit 64. The pickup unit 64 is also connected to the input lead 65 and stores the signals appearing thereon in series and feeds them in groups of three bits each to the storage units 63 or 73. The first unit 63 receives the code words of the main channels, while the second unit 73 receives those of the auxiliary channels. Both units 63 and 73 transmit code words of six bits each to the information converter 62, which converts them into a form suitable for the operation of teletypewriters in start-stop operation. The converter 62 output is coupled to an output unit 61 for the main channels and to the output unit 71 for the auxiliary channels. From there they are transmitted to the output leads 56(1)...56($n$–3) comprising the main channels and to the leads 57(1)...67($m$) respectively, comprising the auxiliary channels.

In a manner similar to the transmitter, all circuits are controlled by the pulses $a—f$ originating from the time slot counter 52 and by the signals originating from the control circuit 55. The distribution of the signals from the corresponding storage units 63 and 73 is effected depending on the condition of the counter 53 for the signals of the main channels and of the counter 54 for the auxiliary signals.

Assuming that three bits arrive from the lead 65 and are stored during the sync periods $a—c$ in the pickup unit 64, which bits belong to a signal in a main channel; they are stored in the first three stages of the storage unit 63. The first bit is transmitted from there to the control circuit 55 and determines whether the next three bits, which are received during the time slots $d$–$f$, are stored during the next period $a$ in storage 63 or in storage 73. In the following time slots $b$ and $c$, the code word is fed from storage unit 63 into the information converter 62 and from there into the output unit 61. If a group of bits is to be fed from the pickup unit 64 into the storage unit 73 for auxiliary channel signals, the condition of the counter 54, which operates in synchronism with the counter 4 in the transmitter, determines in which part of the storage unit 73 the storage is to be effected. The counter 54 is advanced a half count, exactly like the counter 4, according to each 0 appearing in the first bit in a main or auxiliary code word. If the synchronization signal is transmitted over an auxiliary channel, as described above for the auxiliary counter, it is associated with a similar frame synchronization circuit. If it is transmitted over the $n$th main channel, its transmission is effected after reception of the $n$th code word from the storage 63 to the counter either directly or over the code converter 62. The transmission consists in that the counter is set to the position indicated by the code word. In general, it is already in this position. But, if there should have been a transmission error during the preceding frame, the counter is brought readily to the correct position at the end of the frame, unless the synchronization is out of step or an error is made just during the transmission of the counter position.

Within the framework of the invention, it is also possible to use other code words than those described above and there can also be a different number of time increments per channel.

Other modifications are likewise possible. In particular, the method can also be used for the transmission of PCM telephony (pulse code modulation). In this case the lines 6(1)... and 7(1) carry telephone signals which are scanned in the input circuits. The scanning outputs are transmitted as voltage values to the information converter 12, which would be an analogue-digital converter. The $\alpha$ signal would be replaced by a signal indicating that the respective subscriber has hung up while the $\beta$ signal would be replaced by a signal indicating that there is a pause in the conversation. The other parts of the transmitter remain unchanged. Naturally the number of bits per channel and the bit rate must be adapted to the respective requirements.

Similar units corresponding to the transmitter must also be used in the receiver. In particular, the information converter 62 would be a digital-analogue converter.

While there has been shown and described what is at present considered to be the preferred embodiment of the invention, modifications thereto will readily occur to those skilled in the art. It is not desired therefore that the invention be limited to those specific arrangements shown and described, but it is to be understood that all equivalents, alterations, and modifications within the spirit and scope of the present invention are herein means to be included.

We claim:

1. A system for multiplex transmission of a plurality of transmission channels over transmission means comprising in combination: a transmitter for main and auxiliary channels of said plurality of transmission channels comprising a first and second input circuit each having a plurality of input leads coupled thereto for receiving input signals comprising long and short code words from respective message sources; a clock signal source; a time slot counter coupled to said clock source providing an output of a plurality of slot pulses defining a channel period thereby; a main channel counter circuit coupled to said time slot counter and being advanced by a pulse therefrom every channel period and providing a plurality of output pulses defining a frame period and being coupled to said first input circuit to provide channel period timing signals thereto; an information converter coupled to said first and second input circuit for converting each input signal into a digital code word suitable for synchronous, multiplex transmission; a first and a second storage device coupled to said information converter, said first storage device being assigned to said main channels and said second storage device being assigned to said auxiliary channels; an auxiliary channel counter circuit coupled between said information converter and said second input means, being operative to be advanced one half count or three time slots upon the occurrence of a short code word in either the main channels or auxiliary channels; a control circuit coupled to said information converter and receiving inputs from said time slot counter and said first storage device to effect transmission of said long code words in said main channels but selectively coupling said short code words into predetermined auxiliary channels during certain channel periods to utilize heretofore unused transmission time; an output unit coupling a multiplexed output signal from said information converter to said transmission means, and a receiver.

2. The system of claim 1 further including at said receiver, circuit means operative to provide a respective plurality of message outputs in accordance with said input signals.

3. The system of claim 2 wherein said circuit means comprises a timing circuit coupled to said transmission means, being responsive to said multiplexed output to provide a synchronized timing signal and a reset signal for said receiver; a pickup unit coupled to said transmission means and said timing circuit; a third and a fourth storage device coupled to the pickup unit; a second time slot counter coupled to said timing circuit producing a plurality of slot pulses to reestablish a channel period; a second main channel counter circuit coupled to said second time slot counter being advanced every channel period and provides a plurality of output pulses to reestablish a frame period; a second information converter coupled to said third and fourth storage device; a second auxiliary channel counter coupled between said second information converter and to said third storage device; a second control circuit coupled between said third storage device and said information converter; and third and fourth output circuits, each having a plurality of output means, said circuit means being operable in reverse of said transmitter to provide respective message outputs on said output means.

4. A method for multiplex signal transmission from a plurality of input lines of a transmitter to a corresponding plurality of output lines of a receiver comprising the steps of:

dividing the total transmission time into frame periods of equal duration;

subdividing each frame period into a predetermined number of channel periods smaller in number than the number of said plurality of said input and output lines respectively;

assigning each of said input lines and the corresponding output line either to a main channel or to an auxiliary channel, the number of main channels being equal to said predetermined number of channel periods;

assigning each channel period of a frame period to one predetermined main channel;

subdividing each channel period into a predetermined number of timeslots;

dividing the class of signals comprising operating signals for performing control functions, and code signals which represent the information to be transmitted into two groups, one consisting of a majority of signals of said class which occur less frequently in a typical transmission interval and another consisting of a minority of signals of said class which occur more frequently in a typical transmission interval;

assigning to each signal of the majority group a code combination consisting of a first number of bits, which is not greater than the number of time slots contained in one channel period;

assigning to each signal of the minority group a code combination consisting of a second number of bits which is smaller than said first number of bits;

converting each signal received on said input lines to a code combination assigned thereto; and transmitting during predetermined channel periods or fractions thereof sync signals, and transmitting during each remaining channel period a code combination converted from a signal of the main channel assigned to this channel period, and occupying either a whole channel period or a fraction of a channel period depending whether the signal belongs to said majority or to said minority group, and transmitting during each nonoccupied fraction of a channel period bits of a code combination converted from a signal of an auxiliary channel.

5. The method as set forth in claim 4 including the step of including in each of said first and second number of bits a characteristic bit which indicates whether the code combination consists of said first or second number of bits.

6. The method as set forth in claim 4 wherein information is transmitted by code combinations of said majority group and operating signals are transmitted by code combinations of said minority group.

7. A system for digital time multiplex transmission comprising in combination: a plurality of main and auxiliary input lines and of corresponding main and auxiliary output lines; a transmitter having a plurality of main and auxiliary input circuits each connected to one of said main and auxiliary input lines respectively for receiving and storing input signals from each of these input lines separately; pulse generating means delivering slot pulses each defining one time slot, and channel period pulses each defining one channel period; each main input circuit being assigned to one of said channel periods; signal converter means connected to said main input circuits for receiving during each channel period a signal representing the information to be transmitted from one of said main input circuits selected by the channel period pulse assigned thereto, said converter means being further connected to said auxiliary input circuits for receiving signals representing the information to be transmitted therefrom and for converting the received signals into corresponding code words, to be transmitted; the code words being divided into two groups, one group consisting of a majority of the code words which occur less frequently in a typical transmission interval and which consist of a number of bits not greater than the number of time slots within one channel period, and a second group consisting of a minority of code words which occur more frequently in a typical transmission interval and which consist of a second number of bits smaller than the said first number, each code word including a characteristic bit indicating whether the code word belongs to said majority or said minority of code words; main storing means connected to said signal converter means and adapted for receiving during each channel period one code word converted from a signal received from the main input circuits; auxiliary storing means connected to said signal converter means and adapted for receiving code words therefrom converted from signals received from the auxiliary input circuits; output means connected to said main and auxiliary storing means and to said transmission means for receiving code words from said main and auxiliary storing means and delivering the code words to said transmission means; control circuit means, controlled by said main storing means and said pulse generating means for controlling the transfer of signals from the auxiliary input circuits to said signal converter means and the transfer of code words from said signal converter means to said auxiliary storing means and for controlling the transfer of the bits of the code words from said main and said auxiliary storing means so that during one channel period either the bits of a code word from one of said main input circuits belonging to said minority of signals, or the bits of a code word from one of said main input circuits belonging to said majority of signals and bits of a code word from one of said auxiliary input circuits are transmitted from said output means to said transmission means; auxiliary counter means, responsive to said characteristic bit of the code words which belong to said minority of code words, for counting said code words and for cooperating with said control circuit means to control the transfer of signals from said auxiliary input circuit to said signal converter means; and receiver circuit means connected to said transmission means and to said output lines and operative to provide output signals at said output lines in accordance with said input signals.

8. The system of claim 2 wherein said receiver circuit means comprises in combination, a synchronization circuit connected to said transmission means and being responsive to the code words at said transmission means for providing synchronized timing signals and reset signals, a pickup unit connected to said transmission means and to said synchronization circuit for receiving the timing signals thereof, a further main storing means and a further auxiliary storing means which are connected to said pickup device, further pulse generating means controlled by said synchronization circuit for delivering slot pulses and channel period pulses, a code word converter means connected to said further main storing means and to said further auxiliary storing means for receiving code words therefrom and converting them into corresponding signals, a main output circuit and an auxiliary output circuit connected to said code word converter means and to said main output lines and auxiliary output lines respectively for receiving and storing the signals received from said code word converter means and delivering them to said main and auxiliary output lines, further control circuit means controlled by said further main storing means and controlling the transfer of code words from said further auxiliary storing means to said code word converter means and the transfer of code words therefrom through said auxiliary output circuit to said auxiliary output lines, further auxiliary counter means controlled by said code word converter means and responsive to said characteristic bit of said code words belonging to said minority of signals, said further auxiliary counting means adapted to count the said code words and arranged for cooperating with said further control circuit means for controlling the transfer of signals from said code word converter means to said auxiliary output circuit and therefrom to said auxiliary output lines, and said circuit means being operable in reverse to said transmitter to provide respective signals to said main output lines and auxiliary output lines.

9. The system of claim 7 further including circuit means in said transmitter and receiver for effecting transmission of an unequivocal signal in an auxiliary channel.